(12) United States Patent
Jung

(10) Patent No.: US 6,959,060 B2
(45) Date of Patent: Oct. 25, 2005

(54) JITTER REDUCING APPARATUS USING DIGITAL MODULATION TECHNIQUE

(75) Inventor: Woon Jin Jung, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 790 days.

(21) Appl. No.: 09/942,638

(22) Filed: Aug. 31, 2001

(65) Prior Publication Data

US 2002/0025014 A1 Feb. 28, 2002

(30) Foreign Application Priority Data

Aug. 31, 2000 (KR) .............................. 2000-51112

(51) Int. Cl.$^7$ ...................... H04L 25/36; H04L 25/40; H04L 7/00
(52) U.S. Cl. ...................... 375/372; 375/376; 375/373
(58) Field of Search .......................... 375/371–373, 375/375, 376; 370/505, 516; 365/189.01, 365/189.04, 189.05, 189.07; 369/60.01

(56) References Cited

U.S. PATENT DOCUMENTS

| | | | | |
|---|---|---|---|---|
| 4,996,698 A | * | 2/1991 | Nelson | 375/372 |
| 5,311,511 A | * | 5/1994 | Reilly et al. | 370/516 |
| 5,835,543 A | * | 11/1998 | Mazzurco et al. | 375/372 |
| 5,974,105 A | | 10/1999 | Wang et al. | |
| 6,064,706 A | * | 5/2000 | Driskill et al. | 375/372 |
| 6,819,727 B1 | * | 11/2004 | Cucchi et al. | 375/372 |

* cited by examiner

*Primary Examiner*—Phuong Phu
(74) *Attorney, Agent, or Firm*—Fleshner & Kim, LLP

(57) ABSTRACT

A jitter reducing apparatus using a digital modulation technique includes: an elastic store storing data flowed in from an SDH network; a pattern generator controlling a data read speed so the elastic store maintains a constant data storing amount; a modulation sequencer generating a digital signal wave having a constant period and amplitude; and a phase level detector controlling the pattern generator using the digital signal wave of the modulation sequencer.

19 Claims, 4 Drawing Sheets

JITTER REDUCING APPARATUS USING DIGITAL MODULATION TECHNIQUE

BACKGROUND OF THE INVENTION

1. Field of the Invention

The present invention relates to an apparatus for reducing jitter occurring from a Synchronous Digital Hierarchy (SDH) network and, more particularly, to a jitter reducing apparatus using a digital modulation technique.

2. Background of the Related Art

A digital communication network has a function, which existing analog networks lack, of synchronizing a clock frequency of every digital exchange within a network. In general, once synchronization between the connected digital exchanges is established, the digital transmission units are automatically maintained in synchronization. Such synchronization of digital exchanges within a digital network at the level of the whole communication network is called a synchronization plan or a network synchronization.

FIG. 1 is a schematic block diagram of a general synchronous system digital communication network. Digital exchange-1 includes a clock-1 and digital exchange-2 includes a clock-2. A trunk matching circuit accommodates a digital trunk line of the digital exchanges. Each digital trunk line includes an elastic store.

If clock-1 is faster than clock-2, causing the writing speed in the elastic store of digital exchange-2 to exceed the reading speed, a data overflow occurs periodically in the elastic store and results in a data loss. Conversely, a data underflow condition occurs in the elastic store of digital exchange-1, also causing a data loss.

A short cycle of error of the clock frequency is absorbed by the elastic store, but, if the error of the clock frequency continues for a long time, a phenomenon occurs that a data loss repeatedly occurs due to the overflow or the underflow of the elastic store. No matter how high the stability of the clock inserted in the digital exchange is, an unstable component of the clock is introduced in a bit stream due to a physical variation of a transmission medium, which is called jitter.

FIG. 2 is a schematic block diagram showing the construction of a jitter reducing apparatus in accordance with the background art. A conventional jitter reducing apparatus includes a digital part and an analog part. The digital part includes an elastic store (ES) 1, a threshold level detector 2, a smooth read pattern generator 3, a Phase Locked Loop (PLL) store 4, and a phase comparator 5. The analog part is a PLL 6 consisting of Low Pass Filter (LPF) and a voltage controlled oscillator.

ES 1 is a buffer for storing data inputted from the SDH network and has a storing structure of 8 bytes (width)*32 (depth). The threshold level detector 2 compares an offset value of a WAD[4:0] signal and a RAD[4:0] signal of ES 1 and controls the smooth read pattern generator 3 based on the comparison. That is, the threshold level detector 2 obtains a difference value between the amount of data stored in ES 1 and the amount of data outputted from ES 1. If the amount of data stored in ES 1 is greater than the amount of data outputted, the threshold level detector 2 controls the smooth read pattern generator 3 to output the data faster using the REN signal.

While the PLL store 4 is reading a gapped data stored in ES 1, the smooth read pattern generator 3 changes a burst pattern of the gapped data to a smooth pattern having uniform timing, which is called a flattening function. PLL store 4 stores the data of ES 1, which has undergone the flattening process, and has a storing structure of 8 bytes (width)*8 (depth).

Phase comparator 5 detects a phase difference between a write clock frequency and a read clock frequency of the PLL store 4 and outputs it to the LPF of PLL 6. The LPF of the analog part removes a jitter component, which has moved to a radio frequency band, by a method for extracting only a low frequency component. The voltage controlled oscillator (VCO) controls the read clock frequency and maintains the locked state of PLL 6.

A Plesiochronous Digital Hierarchy (PDH) signal flowing in from the SDH network is stored in ES 1. The PDH signal is pure PDH data (WE[7:0] & WEN) of which overhead and control data required for the SDH network have been already removed by the SDH Path Terminating unit.

Data stored in ES 1 is read by the smooth read pattern generator 3. Data inputted to the ES 1 is of a burst pattern having an irregular timing, while data outputted from ES 1 is of a smooth pattern having an even timing distribution. The smooth read pattern generator 3 is controlled by the threshold level detector 2 so that the amount of data stored in ES 1 and the amount of data outputted from ES 1 can be constantly maintained.

The data (RD[7.0] & REN) read by the smooth read pattern generator 3 is stored in the PLL store 4 and then a final PDH signal is restored by phase comparator 5 and PLL 6. The restored PDH signal is transmitted through a transmission line to a PDH transmission network.

Phase comparator 5 measures a phase difference between the write clock frequency (an external reference clock frequency) and the read clock frequency (an internal clock frequency) created from the VCO. Then, a noise component of the measured value is removed and supplied to the VCO. The VCO controls the read clock frequency so the read clock frequency and the write clock frequency correspond to each other.

In the background art apparatus, controlling the speed of reading data from ES 1 depends only on the offset comparison between the WAD[4:0] and the RAD [4:0] signals. Thus, it is difficult to effectively reduce jitter. As the PDH signal containing the jitter is transmitted to the network, it causes a data loss or an error.

As a solution to such problems, the background art apparatus additionally includes an analog circuit (not shown) to reduce the jitter, which, however, causes an increase in cost.

SUMMARY OF THE INVENTION

An object of the invention is to solve at least the above problems and/or disadvantages and to provide at least the advantages described hereinafter.

Therefore, an object of the present invention is to provide a jitter reducing apparatus using a digital modulation technique that is capable of solving the incomplete jitter removal problem. The jitter reducing apparatus is a digital device, thereby facilitating its implementation by a digital ASIC circuit.

To achieve these and other advantages and in accordance with the purpose of the present invention, as embodied and broadly described herein, there is provided a jitter reducing apparatus using a digital modulation technique including: an elastic store storing a data flowing in from an SDH network; a pattern generator controlling a data reading speed so as for the elastic store to maintain a certain data storing amount; a modulation sequencer generating a digital signal wave having a predetermined period and amplitude; and a phase level detector controlling the pattern generator by using the digital signal wave of the modulation sequencer.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention, examples of which are illustrated in the accompanying drawings.

Figure 1:
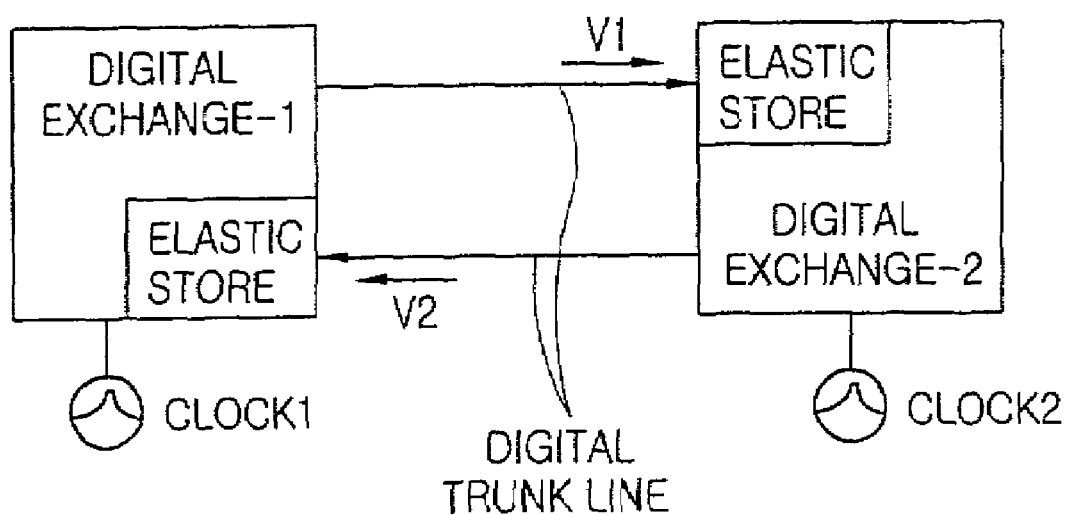
FIG. 1 illustrates a schematic block diagram of a general digital communication network.
Figure 2:
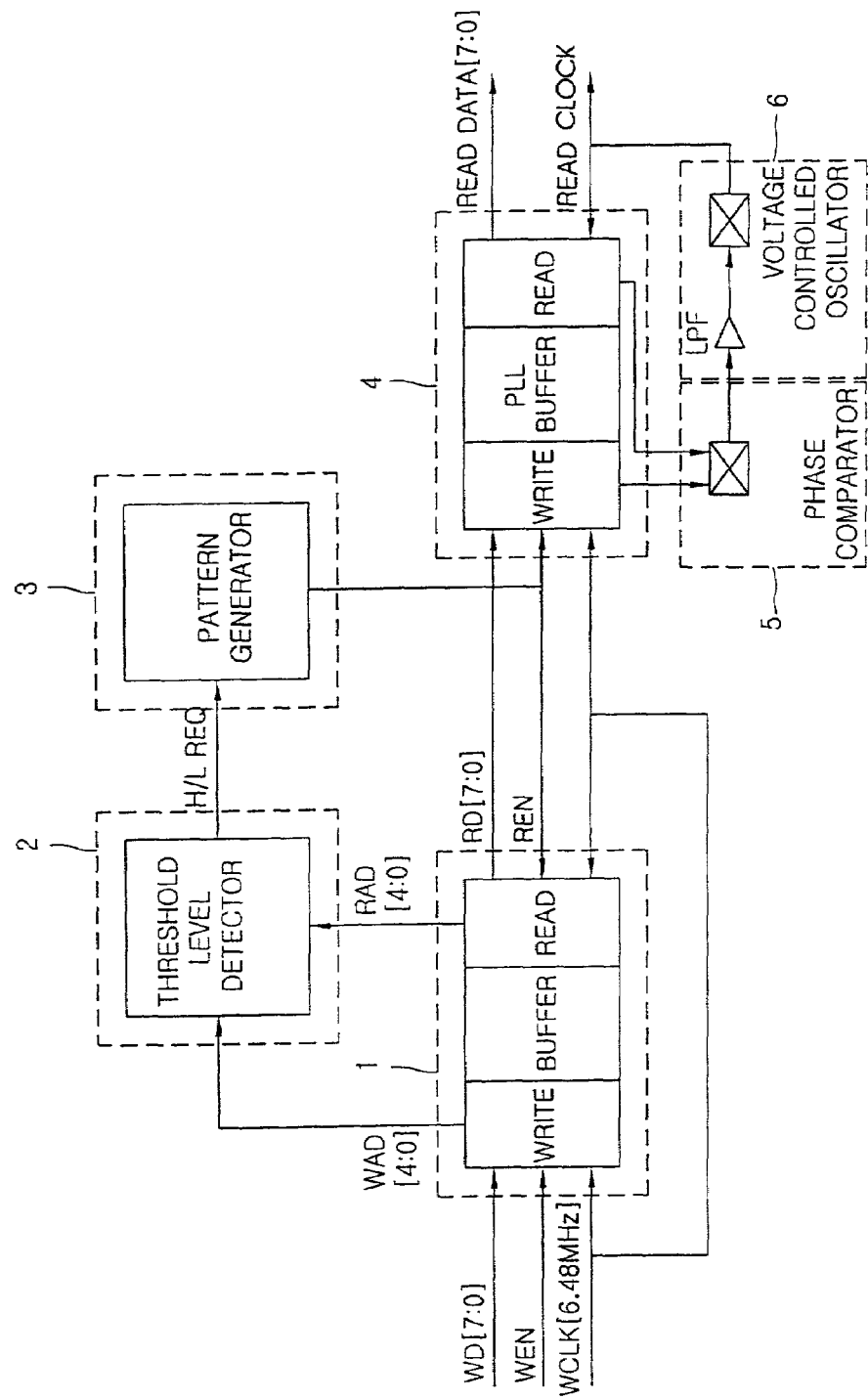
FIG. 2 illustrates a schematic block diagram of a jitter reducing apparatus of the background art.
Figure 3:
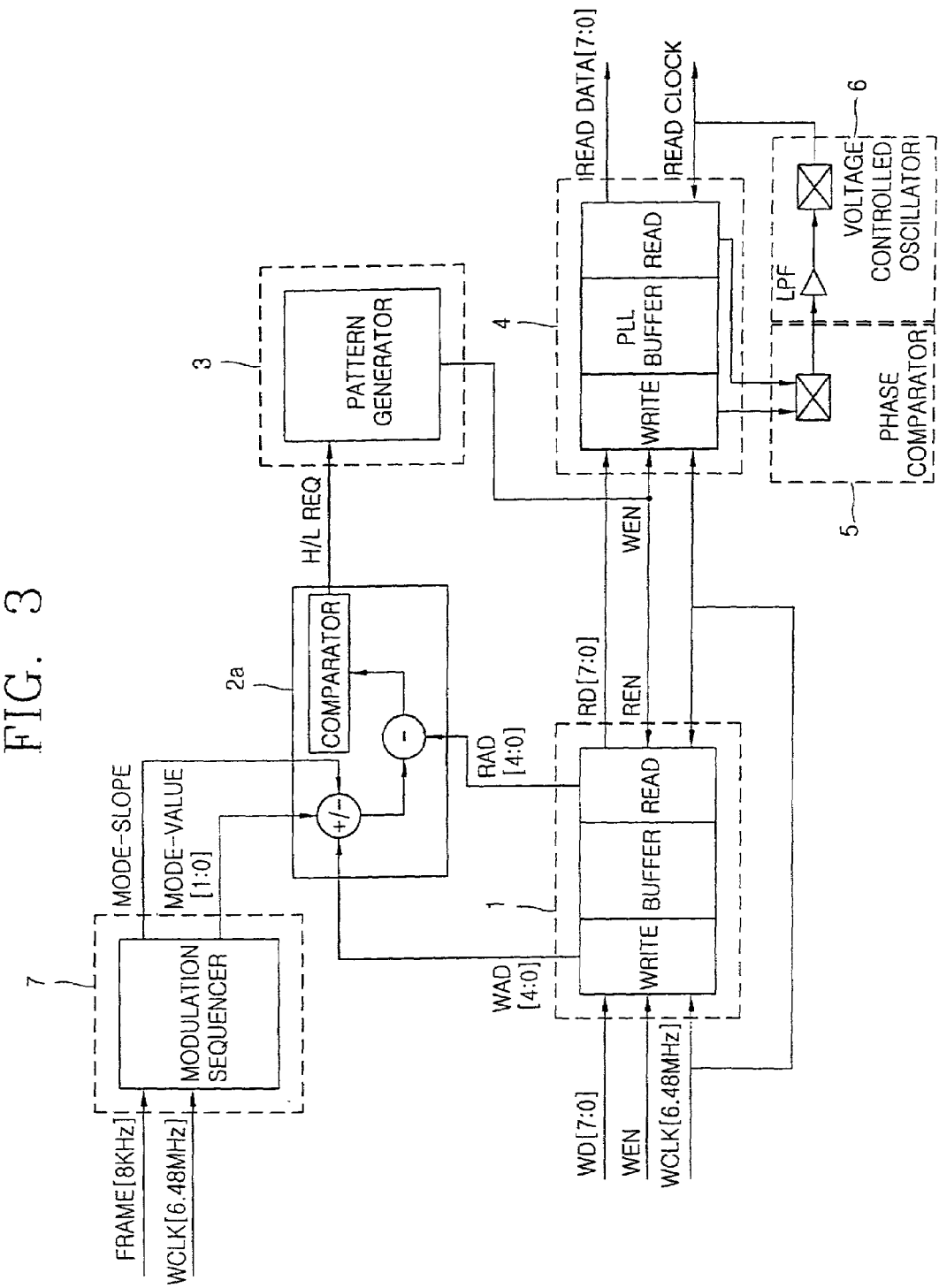
FIG. 3 illustrates a schematic block diagram of a digital jitter reducing apparatus using a digital modulation technique in accordance with a preferred embodiment of the present invention.

FIG. 3 is a schematic block diagram of a jitter reducing apparatus using a digital modulation technique in accordance with a preferred embodiment of the present invention. The digital jitter reducing apparatus includes a digital part and an analog part. The digital part includes an ES 1, a phase level detector 2a, a modulation sequencer 7, a pattern generator 3, a PLL store 4 and a phase comparator 5. The analog part is a PLL 6 consisting of an LPF and a voltage controlled oscillator.

ES 1 is a buffer that stores data flowing in from the SDH network, having a size of 8 bytes (width)×32 (depth). Modulation sequencer 7 generates a mode-value signal and a mode-slope signal representing a modulation frequency having a certain period and amplitude and applies these signals to the phase level detector 2a. The phase level detector 2a compares an offset (i.e., difference) value of the WAD[4:0] and RAD[4:0] signals of ES 1 to a preset reference value and controls the pattern generator 3 with the digital modulation frequency applied from the modulation sequencer 7. The operation of the phase level detector 2a is described more fully below.

Phase level detector 2a receives four signals and controls the pattern generator 3 based on the four signals. The operation of the phase level detector 2a is as follows:

In case that the input signal mode_slope is '0,' (WAD[4:0]+Mode_value[1:0])−RAD[4:0].

In case that the input signal mode_slope is '1,' (WAD[4:0]−Mode_value[1:0])−RAD[4:0].

The WAD[4:0] and RAD[4:0] signals are comprised of five bits and the Mode_value[1:0] signal has two bits. The arithmetic operation produces a five bit result having a value in the range of 0~31. If the result value is between 0 and 15, the phase level detector 2a outputs '0' (H/L Req signal). If the result value is between 16 and 31, the phase level detector 2a outputs '1' (H/L Req signal), to control the pattern generator 3.

The phase level detector 2a operation has the following effect. If the difference between the WAD[4:0] and RAD[4:0] signals is small, that is if the result of the arithmetic operation is a value between zero and fifteen, then only a small amount of data has been stored in ES 1 and, thus, the output rate of the buffered data should be decreased. On the other hand, if the difference between the WAD[4:0] and RAD[4:0] signals is large, that is if the result of the arithmetic operation is a value between sixteen and thirty-one, then a large amount of data has been stored in ES 1 and the output rate of the data should be increased.

When the pattern generator 3 receives '0,' it controls the data input/output speed between ES 1 and the PLL store 4 to be high. If, however, the pattern generator 3 receives '1,' it controls the input/output speed between ES 1 and the PLL store 4 to be low. In this manner, the pattern generator 3 controls the data stream speed as requested by the whole network.

The phase level detector 2a includes an adder, subtracters and a comparator for the arithmetic operation. Whenever the mode_value[1:0] value is changed, the phase level detector 2a performs the arithmetic operation to control the pattern generator 3.

Thus, arithmetic operations are performed 16 times for one period (cycle) to control the pattern generator 3. This means that the amount of data inputted to and outputted from ES 1 can be quickly checked and the pattern generator 3 can be immediately controlled.

The burst pattern of the incoming data (WD[7:0]) causes the jitter noise. Namely, when synchronized units receive and transmit data signals with each other, each data signal should maintain constant temporal intervals within the data stream. If the data signals have irregular temporal intervals, the data stream takes on a burst pattern. The pattern generator 3 changes such a burst pattern of the data stream into a smooth pattern under the control of the phase level detector 2a.

While the PLL store 4 is reading a gapped data stored in ES 1, the pattern generator 3 changes a burst pattern of the gapped data to a smooth pattern having uniform timing. PLL store 4 stores the data of ES 1 that has undergone the flattening process, having a size of 8 bytes (width)×8 (depth).

Phase comparator 5 detects a phase difference between the write clock frequency and the read clock frequency of the PLL store 4 and outputs it to the LPF of PLL 6. The LPF of PLL 6 removes the jitter component, which has been band-passed to a high frequency, using a method for extracting only a low frequency component. The voltage controlled oscillator controls the read clock frequency to maintain the locked state of PLL 6.

The operation of the digital jitter reducing apparatus of the present invention constructed as described above will now be explained. As for the PDH signal flowing in from the SDH network, before it is inputted to a main apparatus, overhead and a control data which were required for the SDH network are all removed and only a pure PDH data (WD[7:0] & WEN) is stored in ES 1. Though the data written to ES 1 had the burst pattern with an irregular timing when stored to ES 1, it has the smooth pattern with uniform timing distribution, owing to the pattern generator 3, when read from ES 1.

In this respect, the background art threshold level detector 2 controls the pattern generator 3 by sampling the difference value between the amount of data inputted to ES 1 and the amount of data outputted from ES 1. Comparatively, the phase level detector 2a of FIG. 3 samples the difference value between the amount of data inputted to ES 1 and the amount of data outputted from ES 1 and digitally modulates the sampled difference signal using the digital signal wave of the modulation sequencer 7. Then, phase level detector 2a controls the pattern generator 3 with the resulting modulation value.

In the above operational process, the phase level detector 2a is operated at constant time intervals upon receipt of a digital signal wave from the modulation sequencer. Pattern generator 3 also regularly performs a control operation of a pattern generation speed as well. The data (RD[7:0]&REN) read from ES 1 and stored in the PLL store 4, under the control of pattern generator 3, is then restored to the final PDH signal by phase comparator 5 and PLL 6. The restored PDH signal is transmitted through a transmission line to a PCH transmission network.

Phase comparator 5 measures the write clock frequency and the read clock frequency of the PLL store 4 and outputs the measured value to the LPF of PLL 6. Then, the LPF of PLL 6 removes only a noise component of the high frequency band from the inputted signal and outputs the signal to the VCO. Consequently, the VCO controls the read clock frequency so the read clock frequency and the write clock frequency correspond to each other, under the control of the phase comparator 5. This is required to perform synchronization between data transmission devices or networks by conforming the clock frequency of the network.

Figure 4:
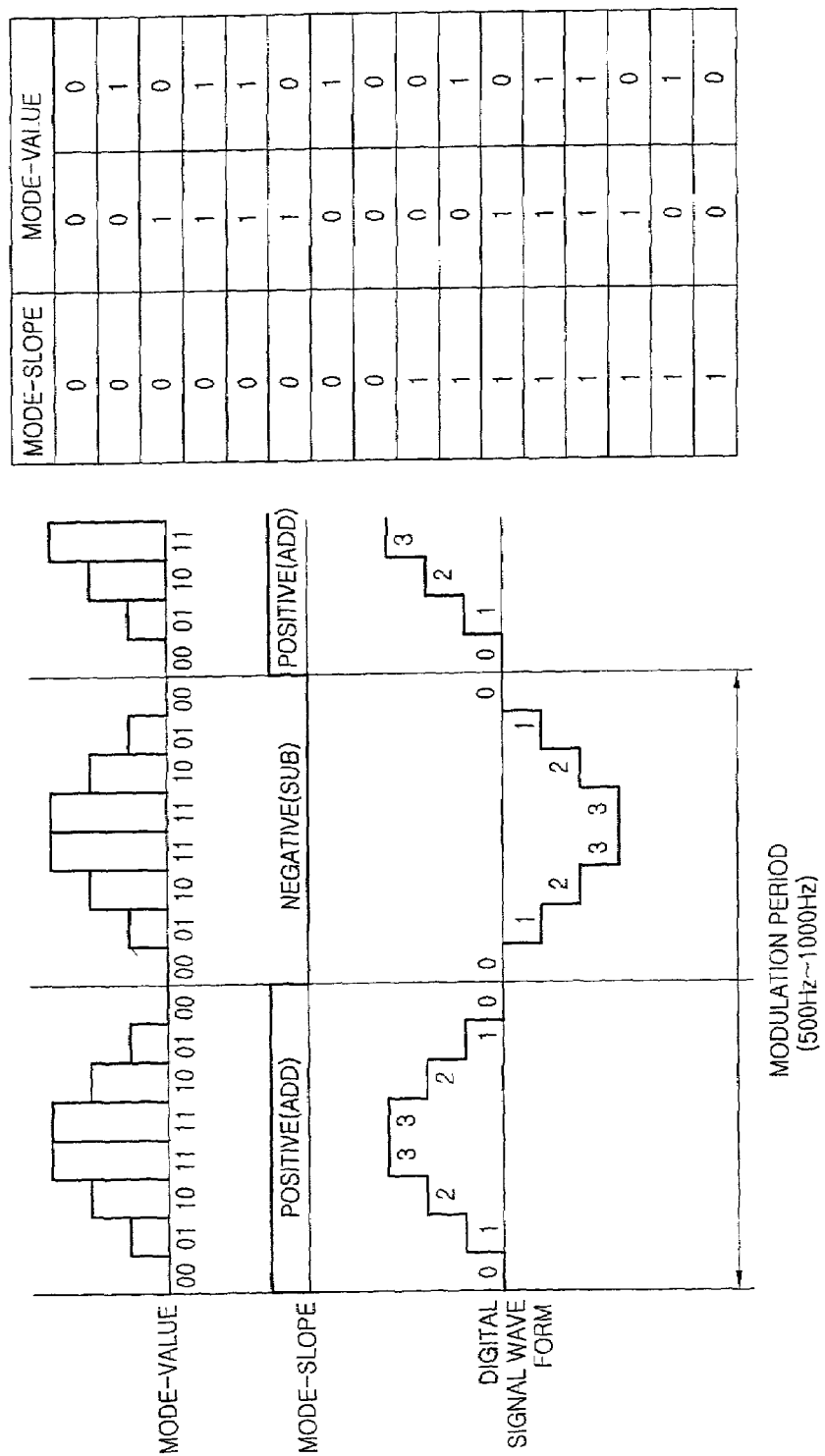
FIG. 4 illustrates a digital signal wave of a modulation sequencer in accordance with the present invention.

FIG. 4 is a diagram illustrating a digital signal wave form of a modulation sequencer in accordance with the present invention. The operation of the modulation sequencer 7 will now be described with reference to FIG. 4.

Modulation sequencer 7 receives an 8 KHz frame signal and a 6.48 MHz WCLK signal from an external SDH overhead processor. These signals have a time invariant phase, since they are synchronized with other systems in the network. The modulation sequencer 7 generates a mode_value [1:] signal and a mode slope signal according to the speed of the external clock. The mode_value [1:0] signal and the mode-slope signal have the forms shown in FIG. 4.

Modulation sequencer 7 outputs a mode-slope signal and a mode-value signal using a low and a high voltage level. Modulation sequencer 7 repeatedly outputs four signal values (00, 01, 10, 11) indicative of an amplitude level of a digital signal wave, through a mode-value signal line, and outputs a signal indicative of a positive and a negative direction through a mode-slope signal line. In this manner, the modulation sequencer 7 implements a 16 divided-cycle digital signal wave having a constant amplitude and period. The positive portion of the digital signal wave has a high level mode-slope signal, signifying the first 8 sections of the cycle, and the negative portion has a low level mode-slope signal, signifying the remaining 8 sections of the cycle. The modulation frequency of the modulation sequencer 7 has a 500 Hz bandwidth, achieved by dividing the 8 KHz frame pulse into 16 sections.

The value of the digital signal wave generated by the modulation sequencer 7 is increased or reduced by 1 as it is increased by stages from 0 to 3, for the first 4 sections of the frame pulse, and is reduced by stages reversely from 3 to 0 for the second 4 sections, during which the positive modulation (mode-slope=high level) is maintained. The value of the digital signal wave is decreased by stages from 0 to −3 for the third of the four sections and positively increased from −3 to 0 for the final four sections, forming a frame pulse of 16 sections. For the third and fourth of the four sections, the negative modulation (mode-slope=low level) is maintained, finishing one modulation period.

As so far described, the jitter reducing apparatus using a digital modulation technique of the present invention has many advantages. That is, for example, by adding the modulation sequencer 7 generating a digital signal wave to the background art jitter reducing apparatus, the incomplete jitter removal problem of the background art is solved. In addition, since the jitter reducing apparatus is implemented solely by the digital circuit, the field Programmable Gate Array (FPGA) or the Application Specific Integrated Circuit (ASIC) can be easily implemented and applied thereby reduce the production cost.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A jitter reducing apparatus, comprising:
   an elastic store that stores data received from a synchronous digital hierarchy (SDH) network;
   a pattern generator that controls a data read speed so the elastic store maintains a constant amount of stored data;
   a modulation sequencer that outputs signals representative of a digital signal wave having a constant period and amplitude, wherein the output signals include a signal indicative of an amplitude of the digital signal wave and a signal indicative of a direction of the digital signal wave; and
   a phase level detector that controls the pattern generator based on the signals output from the modulation sequencer.

2. The apparatus of claim 1, wherein the phase level detector further controls the pattern generator using a difference value between the amount of stored data in the elastic store and an amount of data outputted from the elastic store.

3. The apparatus of claim 1, wherein the phase level detector is operated at time intervals upon receipt of the signals from the modulation sequencer.

4. The apparatus of claim 1, wherein the pattern generator performs a controlling operation of a pattern generation speed at regular time intervals.

5. The apparatus of claim 1, wherein the modulation sequencer is operated upon receipt of an 8 KHz frame pulse and a 6.48 MHz clock frequency.

6. The apparatus of claim 5, wherein the modulation sequencer generates the digital signal wave of which one period is 16 sections of the frame pulse and has a 500 Hz bandwidth.

7. The apparatus of claim 1, wherein the modulation sequencer outputs a mode-value signal indicative of an amplitude level of the digital signal wave and a mode-slope signal indicative of a positive and a negative direction of the digital signal wave.

8. The apparatus of claim 7, wherein the mode-slope signal controls a positive section or a negative section of the digital signal wave.

9. The apparatus of claim 7, wherein the mode-value signal comprises one of four signal values of 00, 01, 10, and 11.

10. The apparatus of claim 7, wherein the mode-value signal and the mode-slope signal implement a binary code signal with a high voltage level and a low voltage level.

11. An apparatus comprising:
an elastic store device to store data;
a pattern generator to control a data read speed from the elastic store device so as to maintain an approximately constant amount of stored data;
a phase level device to control the pattern generator; and
a modulation sequencer to output signals representative of a digital signal wave to the phase level device, the output signals including at least an amplitude signal and a slope signal.

12. The apparatus of claim 11, wherein the phase level device controls the pattern generator based on the signals output from the modulation sequencer and a difference between the amount of stored data in the elastic store and an amount of data outputted from the elastic store device.

13. The apparatus of claim 11, wherein the elastic store device stores data received from a synchronous digital hierarchy network.

14. The apparatus of claim 11, wherein the modulation sequencer outputs a mode-value signal indicative of an amplitude level of the digital signal wave and a mode-slope signal indicative of a positive direction or a negative direction of the digital signal wave.

15. The apparatus of claim 14, wherein the mode-slope signal controls a positive section or a negative section of the digital signal wave.

16. The apparatus of claim 14, wherein the mode-value signal comprises one of four signal values of 00, 01, 10 and 11.

17. The apparatus of claim 14, wherein the mode-value signal and the mode-slope signal implement a binary code signal with a high voltage level and a low voltage level.

18. An apparatus comprising:
an elastic store device to store data;
a modulation sequencer device to output signals representative of a digital signal; and
a device to receive the signals output from the modulation sequencer device and to control a data read speed from the elastic store device, wherein the signals output from the modulation sequencer device include signals indicative of a slope of a digital signal or an amplitude of the digital signal, wherein the modulation sequence device outputs a mode-value signal indicative of an amplitude level of the digital signal and a mode-slope signal indicative of a positive direction or a negative direction of the digital signal.

19. The apparatus of claim 18, wherein the mode-slope signal controls a positive section or a negative section of the digital signal.

* * * * *